United States Patent
Gao et al.

(10) Patent No.: US 9,528,494 B2
(45) Date of Patent: Dec. 27, 2016

(54) METHOD AND SYSTEM FOR OPERATING A WIND TURBINE DURING A FAULT

(75) Inventors: Meng Gao, Shanghai (CN); Cheng Ma, Shanghai (CN)

(73) Assignee: General Electric Company, Schenectady, NY (US)

( * ) Notice: Subject to any disclaimer, the term of this patent is extended or adjusted under 35 U.S.C. 154(b) by 764 days.

(21) Appl. No.: 13/884,189

(22) PCT Filed: Nov. 10, 2010

(86) PCT No.: PCT/CN2010/001798
§ 371 (c)(1),
(2), (4) Date: May 8, 2013

(87) PCT Pub. No.: WO2012/061953
PCT Pub. Date: May 18, 2012

(65) Prior Publication Data
US 2013/0230400 A1    Sep. 5, 2013

(51) Int. Cl.
*F03D 7/02* (2006.01)
*F03D 7/04* (2006.01)

(52) U.S. Cl.
CPC ........... *F03D 7/0224* (2013.01); *F03D 7/0264* (2013.01); *F03D 7/047* (2013.01); *F05B 2260/845* (2013.01); *F05B 2270/1074* (2013.01); *F05B 2270/32* (2013.01); *F05B 2270/328* (2013.01); *Y02E 10/723* (2013.01)

(58) Field of Classification Search
CPC ........ F03D 7/0224; F03D 7/024; F03D 7/047; F03D 7/0244; F03D 7/043; F03D 7/042; F03D 7/0264
See application file for complete search history.

(56) References Cited

U.S. PATENT DOCUMENTS

| 4,348,155 A | 9/1982 | Barnes et al. |
| 5,966,301 A | 10/1999 | Cook et al. |
| 6,783,326 B2 | 8/2004 | Weitkamp et al. |
| 7,699,584 B2 | 4/2010 | Mollhagen |

(Continued)

FOREIGN PATENT DOCUMENTS

| CN | 101311527 A | 11/2008 |
| CN | 201507394 U | 6/2010 |

(Continued)

OTHER PUBLICATIONS

European search report issued in connection with EP Patent Application No. 10859386.4 dated Aug. 14, 2014.

(Continued)

*Primary Examiner* — Gregory Anderson
*Assistant Examiner* — Maxime Adjagbe
(74) *Attorney, Agent, or Firm* — James McGinness, Esq.; Armstrong Teasdale LLP

(57) ABSTRACT

A method and a system for operating a wind turbine (10) during a fault. The system includes a pitch motor for rotating each rotor blade (18), second pitch sensors (72) for determining when the rotor blade (18) is rotated to a set point, and a backup pitch controller (80). After a fault is detected, the method determines whether the wind speed in the vicinity of the wind turbine (10) is less than or greater than or equal to a maximum rated velocity of the wind turbine (10). The backup pitch controller (80) then rotates the rotor blades (18) to a specific set point based on the determination.

19 Claims, 6 Drawing Sheets

(56) References Cited

U.S. PATENT DOCUMENTS

| 7,717,673 | B2 | 5/2010 | Menke |
|---|---|---|---|
| 2007/0267872 | A1 | 11/2007 | Menke |
| 2008/0030027 | A1 | 2/2008 | Erdman |
| 2009/0155075 | A1 | 6/2009 | Guey |
| 2010/0061852 | A1 | 3/2010 | Potter |
| 2010/0133815 | A1 | 6/2010 | Middendorf |

FOREIGN PATENT DOCUMENTS

| EP | 1456535 B1 | 3/2007 |
|---|---|---|
| JP | 2004011543 A | 1/2004 |
| WO | 2012061953 A1 | 5/2012 |

OTHER PUBLICATIONS

International Search Report and Written Opinion for co-pending CN PCT patent application No. PCT/CN2010/001798 (published as WO 2012/061953 A1).
International Search Report and Written Opinion issued in connection with corresponding PCT Application No. PCT/CN2010/001798 on Jul. 21, 2011.
European office action issued in connection with corresponding EP Application No. 10859386.4 on Aug. 19, 2016.

METHOD AND SYSTEM FOR OPERATING A WIND TURBINE DURING A FAULT

CROSS REFERENCE TO RELATED APPLICATIONS

This application is a U.S. National Phase of Chinese PCT Patent Application No. PCT/CN2010/001798, filed Nov. 10, 2010, which is hereby incorporated by reference in its entirety.

BACKGROUND OF THE INVENTION

The subject matter disclosed herein relates generally to wind turbines and, more particularly, to a method and apparatus for operating a wind turbine during a fault.

Known wind turbines convert the kinetic energy of wind into electrical energy. Wind turbines include one or more blades that rotate when oncoming wind strikes the blades. The flow of wind over the wind turbine blades generates lift, induces rotation, and provides torque to generate power.

At least some known wind turbines include a plurality of controllers within the wind turbine that communicate with each other to control internal components of the wind turbine. Such controllers may include, for example, a pitch controller and a wind turbine controller. Known pitch controllers change a pitch angle of the wind turbine blades. More specifically, known pitch controllers may drive the blades to a desired operating pitch angle based on existing wind conditions, to facilitate enhanced operation. The pitch controller may also rotate the blades to a non-operating, or feathered, position to facilitate reducing the amount of lift induced to the blades from the wind where a major surface of the blade is generally perpendicular to the wind. The blades may be feathered to facilitate preventing damage to the wind turbine, for example, during high wind conditions or during wind turbine fault conditions.

Known wind turbine controllers may function as a master controller for the wind turbine system. For example, a known wind turbine controller may be programmed to control other controllers coupled within the wind turbine, such as the pitch controller. In such configurations, the wind turbine controller issues commands or control messages to the other controllers, and the other controllers implement these commands or control messages on the components subject to their control. For example, the wind turbine controller may issue commands to the pitch controller to pitch the blades to a defined position.

However, wind turbine controllers, such as pitch controllers and wind turbine controllers, may suffer from periodic faults. These faults often arise from losses of communication or other errors in the controllers. The occurrence of such faults may cause undesirable consequences. For example, in one known wind turbine, when a fault occurs, the wind turbine enters a fault state in which a hard braking procedure is implemented and the rotor blades are stopped via mechanical braking and/or through battery-driven braking procedures. Such procedures may induce an undesirable amount of loading upon the wind turbine system and over time, may reduce the operating life of the wind turbine. Moreover, such procedures also cause the wind turbine to operate at a reduced electrical output, with no electrical output, and/or with a reduced operating efficiency. Such procedures thus result in lost and/or reduced revenue generation.

BRIEF DESCRIPTION OF THE INVENTION

In one aspect, a method for responding to faults in a control system in a wind turbine including a rotor coupled to at least one rotor blade, at least two pitch sensors coupled to the rotor blade, at least one pitch drive, and a controller communicatively coupled to the pitch sensors and the pitch drive is provided. The method comprises determining, with the controller, that a fault has occurred in the control system; determining, with the controller, a speed of wind in the vicinity of the wind turbine; and rotating the rotor blade using the pitch drive to a set point if the wind speed is greater than or equal to the maximum rated velocity of the wind turbine, the set point being an angular position of the rotor blade where the rotor blade is feathered.

In another aspect, a method for responding to faults in a control system in a wind turbine including a rotor coupled to at least one rotor blade, at least one pitch sensor coupled to the rotor blade, at least one pitch drive, and a controller communicatively coupled to the pitch sensor and the pitch drive is provided. The method comprises determining, with the controller, that a fault has occurred in the control system; determining, with the controller, a speed of wind in the vicinity of the wind turbine; and, rotating the rotor blade using the pitch drive if the controller determines that the wind speed is less than the maximum rate velocity of the wind turbine until the pitch sensor determines that the rotor blade has been rotated to a set point.

In another aspect, a backup pitch control system for controlling pitch of at least one blade of a wind turbine during occurrence of a fault in a primary control system of the wind turbine. The backup pitch control system comprises a pitch drive for rotating a rotor blade about a longitudinal axis of the rotor blade; a pitch sensor positioned to determine when the rotor blade at a set point; and, a backup controller communicatively coupled to the pitch drive and the pitch sensor, the backup controller configured to control operation of the pitch drive when a fault occurs in the primary control system.

DETAILED DESCRIPTION OF THE INVENTION

The embodiments described here provide pitch control systems for use with a wind turbine. The embodiments use redundant pitch sensors and control modules to operate the pitch control systems during the occurrence of a fault. Rather than ceasing operation of the wind turbine during the occurrence of a fault, the embodiments described herein provide for continued operation of the wind turbine during the fault.

Figure 1:
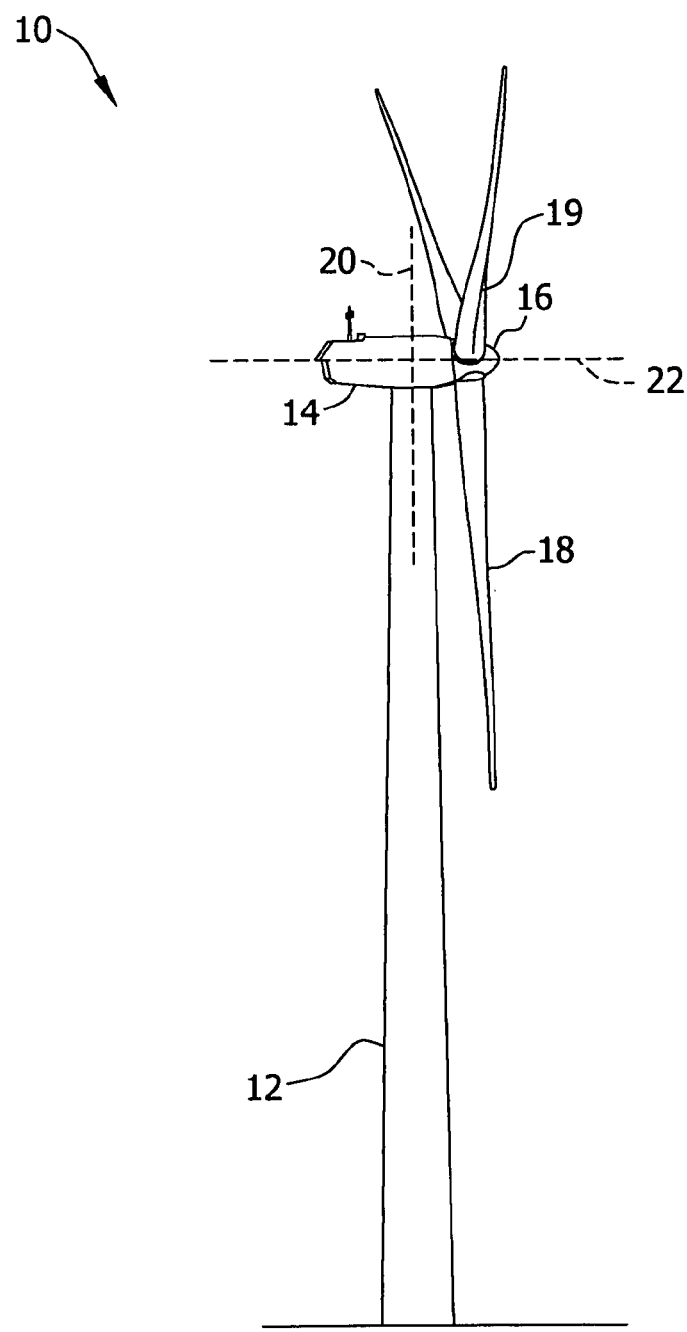
FIG. 1 is a side view of an exemplary wind turbine.

FIG. 1 illustrates an exemplary wind turbine 10. In the exemplary embodiment, wind turbine 10 includes a tower 12, a nacelle 14 that is coupled to tower 12, a hub 16 that is coupled to nacelle 14, and at least one blade 18 that is coupled to hub 16. Tower 12 provides support for nacelle 14, hub 16, and blade 18. Tower 12 may be of such height and construction as is known in the art.

Nacelle 14 houses components (not shown) for use in transforming rotational energy of blade 18 into electricity. Nacelle 14 may be constructed as is known in the art. Hub 16 provides a rotatable housing for at least one blade 18. Hub 16 may be constructed as is known in the art.

At least one blade 18 is coupled to hub 16. In the exemplary embodiment, three blades 18 are coupled to hub 16. Blades 18 are rotatable about an axis of rotation 22 when wind strikes blades 18. In the exemplary embodiment, each blade 18 is oriented substantially perpendicularly to the ground. Each blade 18 rotates through substantially the same plane of rotation and substantially parallel to a centerline axis 20 of tower 12. Each blade 18 may be constructed as is known in the art. Each blade 18 also has a major surface 19 (i.e., a pressure sidewall) adjacent a leading edge of each blade.

During operation, as wind strikes blades 18, blades 18 rotate about hub 16, and the kinetic energy of the wind is transformed into rotational energy by blades 18. More specifically, a rotation of blades 18 rotates a gearbox (not shown) within nacelle 14. The gearbox is coupled to a generator (not shown) within nacelle 14 which generates electricity and the electricity is transmitted via a cable assembly (not shown) extending through tower 12. The cable assembly delivers the electricity to a power grid or other destination.

Figure 2:
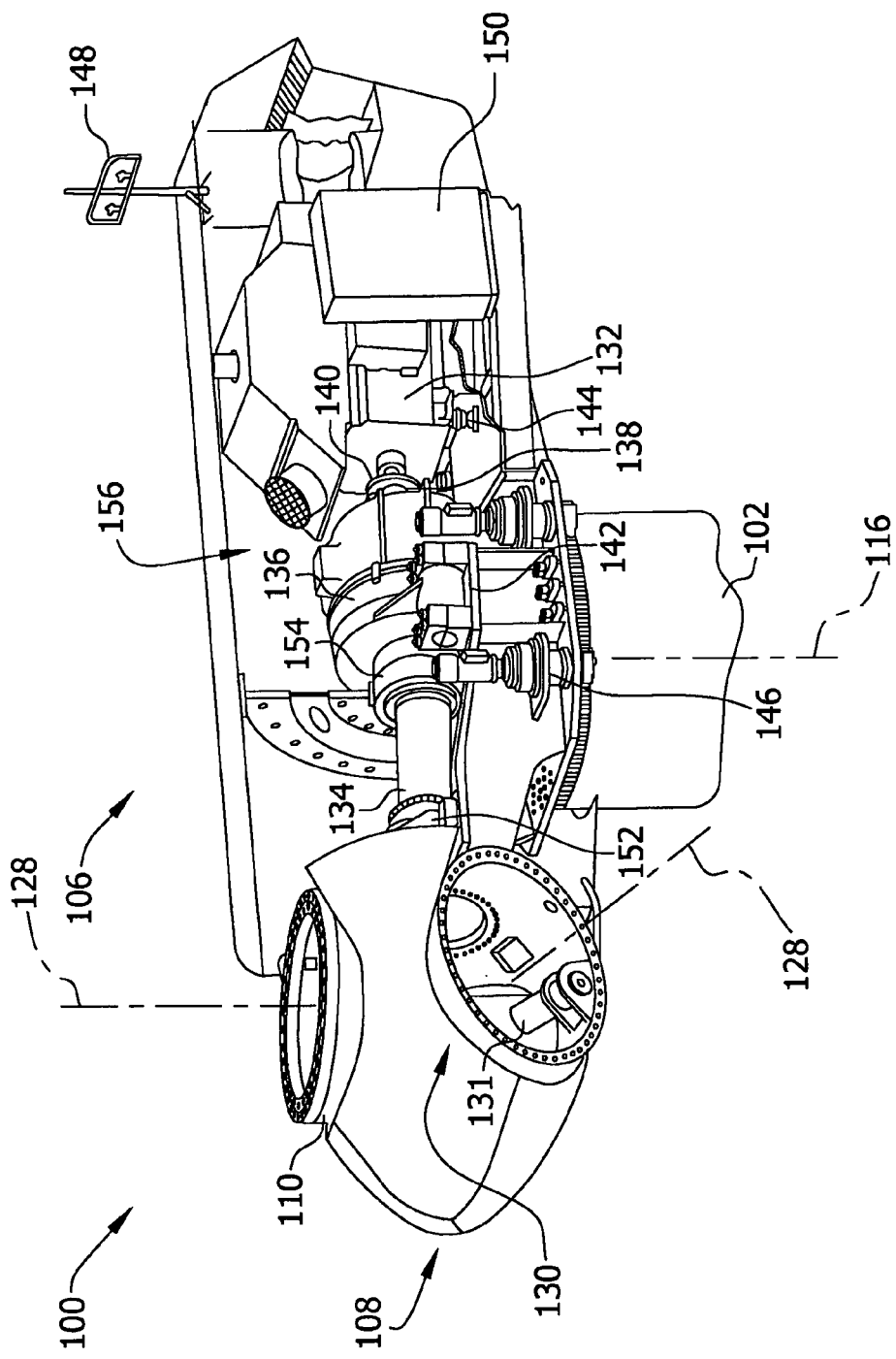
FIG. 2 is a partial sectional view of an exemplary nacelle and hub suitable for use with the wind turbine shown in FIG. 1.

FIG. 2 is a partial sectional view of nacelle 106 of exemplary wind turbine 100 (shown in FIG. 1). Various components of wind turbine 100 are housed in nacelle 106. In the exemplary embodiment, nacelle 106 includes three pitch assemblies 130. Each pitch assembly 130 is coupled to an associated blade 18 (shown in FIG. 1), and modulates a pitch of associated blade 18 about pitch axis 128 parallel to a longitudinal axis of each blade 18. Only one of three pitch assemblies 130 is shown in FIG. 2. In the exemplary embodiment, each pitch assembly 130 includes at least one pitch drive motor 131.

As shown in FIG. 2, rotor 108 is rotatably coupled to an electric generator 132 positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 results in production of electrical power by generator 132. Gearbox 136 is supported by a first support 142 and generator 132 is supported by a second support 144. In the exemplary embodiment, gearbox 136 utilizes a dual path geometry to drive high speed shaft 138. Alternatively, rotor shaft 134 is coupled directly to generator 132 via coupling 140.

Nacelle 106 also includes a yaw drive mechanism 146 that rotates nacelle 106 and rotor 108 about yaw axis 116 (shown in FIG. 1) to control the perspective of rotor blades 112 with respect to the direction of wind 114 (shown in FIG. 2). Nacelle 106 also includes at least one wind measuring device 148 that includes a wind vane and anemometer, or a wind measuring device is suitable laser sensor disposed in hub 16. In one embodiment, wind measuring device 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic controllers (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program. Pitch assembly 130 is operatively coupled to turbine control system 150.

In the exemplary embodiment, nacelle 106 also includes forward support bearing 152 and aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Nacelle 106 may include any number of support bearings that enable wind turbine 100 to function as disclosed herein. Rotor shaft 134, generator 132, gearbox 136, high speed shaft 138, coupling 140, and any associated fastening, support, and/or securing device including, but not limited to, first support 142, second support 144, forward support bearing 152, and aft support bearing 154, are sometimes referred to as a drive train 156.

Figure 3:
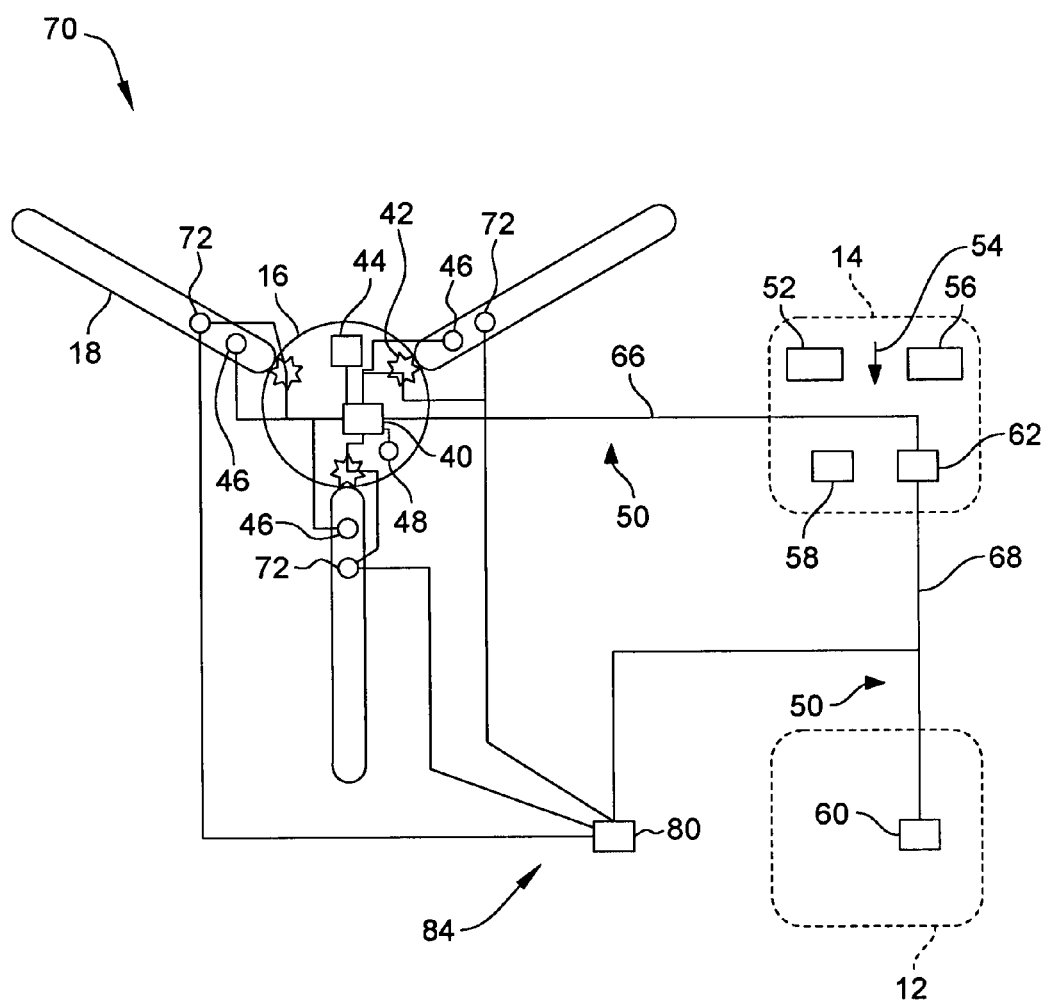
FIG. 3 is a schematic view of an exemplary wind turbine pitch control system that may, be used with the wind turbine shown in FIG. 1.

FIG. 3 illustrates a schematic view of an exemplary wind turbine pitch control system 70 and a backup pitch controller 80 (described in greater detail below) that may be used with wind turbine 10 (shown in FIG. 1). Control system 70 is coupled to components within hub 16, blades 18, nacelle 14, and tower 12. In the exemplary embodiment, hub 16 includes a pitch controller 40, at least one pitch drive 42, a hub backup power supply 44, and a hub sensor 48. Pitch controller 40 is coupled to blades 18 through pitch drives 42. In one embodiment, hub 16 includes three pitch drives 42, such that pitch controller 40 is coupled to each blade 18 via a respective pitch drive 42.

In the exemplary embodiment, pitch controller 40 is located within hub 16 and controls, for example, a pitch angle (not shown) and/or a relative position (not shown) of blades 18. Moreover, pitch controller 40 communicates with a wind turbine controller 60 via a communication network 50. In the exemplary embodiment, pitch controller 40 includes a programmable logic controller (PLC). In an alternative embodiment, pitch controller 40 includes a microprocessor, a microcontroller, a field programmable gate array (FPGA) or any other programmable circuit that enables pitch controller 40 to operate as described herein. As used herein, the term "control" includes, but is not limited to only, issuing commands to be implemented by exercising oversight and supervision of, and/or directing operation of, one or more subject components. The term "control" also includes a regulation-type of control, e.g. a feedback-loop regulation.

In the exemplary embodiment, pitch drives 42 receive one or more pitch commands from pitch controller 40, and in response, rotate blades 18 to a position and/or a pitch angle identified by the pitch commands. Pitch drives 42 may rotate blades 18 using, for example, hydraulic, electric, or gear-driven means. In the exemplary embodiment, hub sensor 48 determines a speed of rotation of and/or a load induced to hub 16. Hub backup power supply 44 may include, for example, a battery, a magnetic energy storage device, or one or more capacitors. Hub backup power supply 44 provides electrical power to components within hub 16, such as pitch controller 40, pitch drives 42, and hub sensor 48, in the event of a fault (described in greater detail below).

In the exemplary embodiment, each blade 18 includes a blade sensor 46 (i.e., limit switch) coupled thereto. Each blade sensor 46 is also coupled to pitch controller 40. Blade sensors 46 enable a speed of rotation of and/or a load induced to each blade 18 to be determined. Blade sensors 46 also detect an angular position of each corresponding blade 18. In the exemplary embodiment, nacelle 14 includes a gearbox 52, a brake 54, a generator 56, a battery 58, and a nacelle controller 62. In an alternative embodiment, nacelle 14 does not include gearbox 52. In another alternative embodiment, nacelle 14 does not include nacelle controller 62. In the exemplary embodiment, gearbox 52 enables an augmentation of a rotation of a main rotor shaft (not shown) driven by the rotation of blades 18, thereby inducing a higher amount of rotational energy to generator 56. Brake 54 may provide emergency stopping power to generator 56 and/or to wind turbine 10 operation in an event of a fault or other error condition. Generator 56 transforms rotational energy of the main rotor shaft into electrical energy. Generator 56 may be of any suitable type, for example and without limitation, a wound rotor induction generator, such as a doubly fed induction generator. Battery 58 provides backup electrical power to nacelle 14 and tower 12 components in the event of a communication loss.

Nacelle controller 62 controls the operation of components within nacelle 14, such as gearbox 52, brake 54, generator 56, and/or battery 58. In the exemplary embodiment, nacelle controller 62 is coupled to pitch controller 40 and to wind turbine controller 60 via communication network 50. More specifically, in the exemplary embodiment, nacelle controller 62 is coupled to pitch controller 40 via a nacelle-hub network 66, and to wind turbine controller 60 via a nacelle-tower network 68.

In the exemplary embodiment, wind turbine controller 60 is located within tower 12. In an alternative embodiment, wind turbine controller 60 is located within nacelle 14. Moreover, in the exemplary embodiment, wind turbine controller 60 operates as a master controller of wind turbine 10 and of pitch control system 70, and may include a computer or other processor configured to execute control algorithms. Wind turbine controller 60 may control other controllers of wind turbine 10, such as pitch controller 40, communicate with other wind turbines (not shown) and/or a wind farm management system (not shown), and perform error handling and operational optimization. Moreover, wind turbine controller 60 may also execute a SCADA (Supervisory, Control and Data Acquisition) program.

Hub 16 is coupled to nacelle 14 and tower 12 via communication network 50. Communication network 50 includes nacelle-hub network 66, nacelle-tower network 68, and backup network 84. More specifically, in the exemplary embodiment, hub 16 is coupled to nacelle 14 via nacelle-hub network 66, nacelle 14 is coupled to tower 12 via nacelle-tower network 68, and backup pitch controller 80 is coupled to tower 12 via nacelle-tower network 68. Moreover, pitch controller 40 is coupled to wind turbine controller 60 via nacelle-hub network 66 and via nacelle-tower network 68. In the exemplary embodiment, nacelle-hub network 66 uses a slip ring connection to transmit signals via a serial communication protocol or another communication protocol, such as broadband over power line (BPL). In an alternative embodiment, nacelle-hub network 66 includes any other connection that enables network 66 to operate as described herein. In the exemplary embodiment, nacelle-tower network 68 includes one or more of such connections as Ethernet LAN, wireless LAN, a Controller Area Network (CAN) bus, fiber optic connection, or any other communication connection (all not shown) that enables nacelle-tower network 68 to operate as described herein.

During operation, rotation of blades 18 causes rotation of the main rotor shaft, resulting in electricity being produced by generator 56. Wind turbine controller 60 monitors the rotational speed and loading of blades 18 using blade sensors 46 and/or hub sensor 48. If wind speed exceeds a rated speed of wind turbine 10, wind turbine controller 60 transmits control commands to pitch controller 40 to increase or decrease the pitch angle of blades 18 as necessary to facilitate reducing the lift induced to blades 18 by the wind by rotating blades 18 such that major surface 19 of blades 18 is generally perpendicular to the direction of the wind. When major surface 19 of blades 18 is generally parallel to the direction of the wind and the leading edge of blades 18 is parallel to the direction of the wind, blades 18 generate the maximum amount of lift.

In the exemplary embodiment, wind turbine controller 60 transmits such control commands via communication network 50 to pitch controller 40. Upon receipt of the control commands, pitch controller 40 implements the control commands by directing pitch drives 42 to rotate blades 18 by an amount specified in the control commands. Specifically, in response to control commands, pitch drives 42 rotate blades 18 to the pitch angle specified by pitch controller 40. In the exemplary embodiment, pitch control system 70 relies at least partially upon communication network 50 for communication between wind turbine controller 60 and pitch controller 40. However, faults may arise during operation of pitch control system 70, communication network 50, wind turbine controller 60, and/or pitch controller 40. The faults may be due to any number of conditions or irregularities (e.g., loss of communication between any of the aforementioned components), failure of components (e.g., a thyristor), or malfunctions in pitch drives 42 (e.g., overheating of pitch drives 42). In the exemplary embodiment, as described in more detail below, pitch control system 70 is programmed to respond to such situations to facilitate reducing an amount of time that wind turbine 10 operates at reduced electrical output, with no electrical output, or with a reduced operating efficiency.

Backup pitch controller 80 is provided for controlling the pitch of blades 18 during the occurrence of a fault and is separate from pitch control system 70 and wind turbine controller 60. Backup pitch controller 80 is located within nacelle 14 in the exemplary embodiment, although in other embodiments it may be located within tower 12 or any other suitable location. Backup pitch controller 80 is coupled via a separate communication network 84 to second pitch sensors 72, pitch drives 42, and wind turbine controller 60. In the exemplary embodiment, separate communication network 84 is coupled to nacelle-tower network 68, although in other embodiments separate communication network 84 is connected to nacelle-hub network 66 or directly to wind turbine controller 60.

Second pitch sensors 72 are shown schematically in FIG. 3. At least a pair of second pitch sensors 72 is provided for each blade 18 in the exemplary embodiment, although more or fewer second pitch sensors 72 may be provided without departing from the scope of the embodiments. In the exemplary embodiment, second pitch sensors 72 are located within pitch assemblies 130 while in other embodiments second pitch sensors 72 are positioned externally of pitch assemblies (e.g., within blades 18). Moreover, a backup power system (not shown) may be provided to power pitch drives 42.

Figure 4:
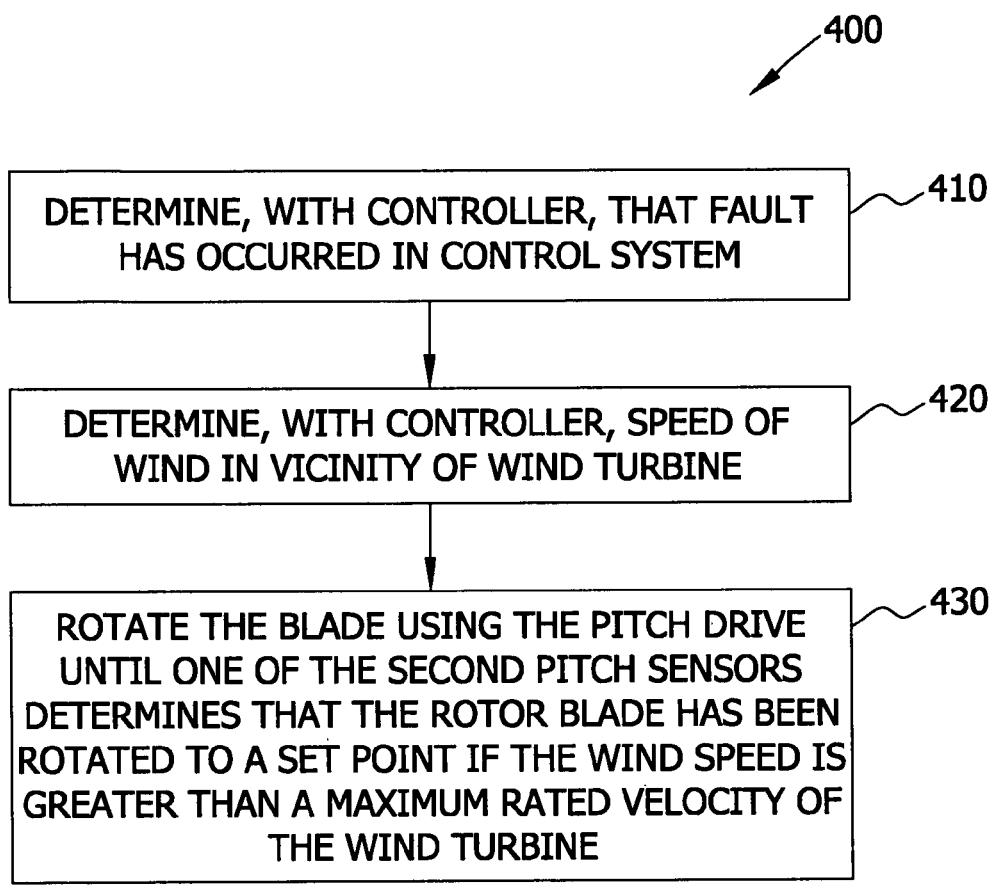
FIG. 4 is a flowchart of an exemplary method for operating the wind turbine shown in FIG. 1.

FIG. 4 illustrates a flowchart of an exemplary method 400 for use in operating wind turbine 10 (shown in FIG. 1) during the occurrence of a fault. Method 400 begins with a determination 410 by backup pitch controller 80 that a fault has occurred in pitch control system 70. In the exemplary embodiment, backup pitch controller 80 makes this determination 410 by receiving a communication from wind turbine controller 60 and/or pitch control system 70 via separate communication network 84.

Method 400 continues with a determination 420 by backup pitch controller 80 of the wind speed in the vicinity of wind turbine 10. Backup pitch controller 80 may detect the wind speed in the vicinity of wind turbine 10 with wind measuring device 148 (FIG. 2) or any other suitable device positioned in the vicinity of wind turbine 10. The maximum rated velocity of wind turbine 10 is the velocity of wind above which the wind turbine 10 may not be subjected to unless blades 18 are in a substantially feathered position where major surface 19 is generally perpendicular to the direction of the wind. In the exemplary embodiment, the maximum rated velocity of wind turbine 10 is 25 m/s. If backup pitch controller 80 determines that the wind speed in the vicinity of wind turbine 10 is greater than or equal to the maximum rated velocity of wind turbine 10, blades 18 are rotated according to method 500 described in greater detail below.

If the controller determines that the wind speed in the vicinity of wind turbine 10 is greater than or equal to the maximum rated velocity, blades 18 are then rotated 430 by pitch drives 42 until one of second pitch sensors 72 determines that blades 18 have been rotated to a set point. As described above, pitch drives 42 rotate blades 18 about the longitudinal axis of blades 18. The set point is an angular position of blades 18 that is the angle at which wind strikes major surface 19 of blades 18. In this embodiment, the set point is angular position of blades 18 such that major surface 19 of blades is substantially perpendicular to the direction of the wind (e.g., 0 degrees or within +/−2 degrees of 0 degrees) (such that pitch angle is approximately 90 degrees) such that blades 18 are feathered and generate substantially no lift.

Second pitch sensors 72 are positioned with respect to blades 18 based on the set point such that each sensor indicates when blades 18 have an angular position that corresponds with the set point. In the exemplary embodiment, two second pitch sensors 72 are provided. One of second pitch sensors 72 is positioned at the set point for use in method 400, while the other second pitch sensor is positioned at another set point for use in method 500 corresponding to the angular position of blade 18 in a feathered position with major surface 19 of blade 18 generally perpendicular to the direction of the wind resulting in a pitch angle of approximately 90 degrees.

After blades 18 are rotated 430 by pitch drives 42, method 400 may apply a brake (not shown) to prevent further rotation of blades 18. If the fault is cleared or backup pitch controller 80 otherwise determines that the fault is no longer occurring, the brake may be released and control of the system may be returned to pitch control system 70. Moreover, method 400 may continue to monitor the speed of the wind in the vicinity of wind turbine 10. When the speed of the wind drops below the maximum rated velocity of wind turbine 10, method 400 may release the brake and rotate blades 18 as described below in relation to method 500.

Figure 5:
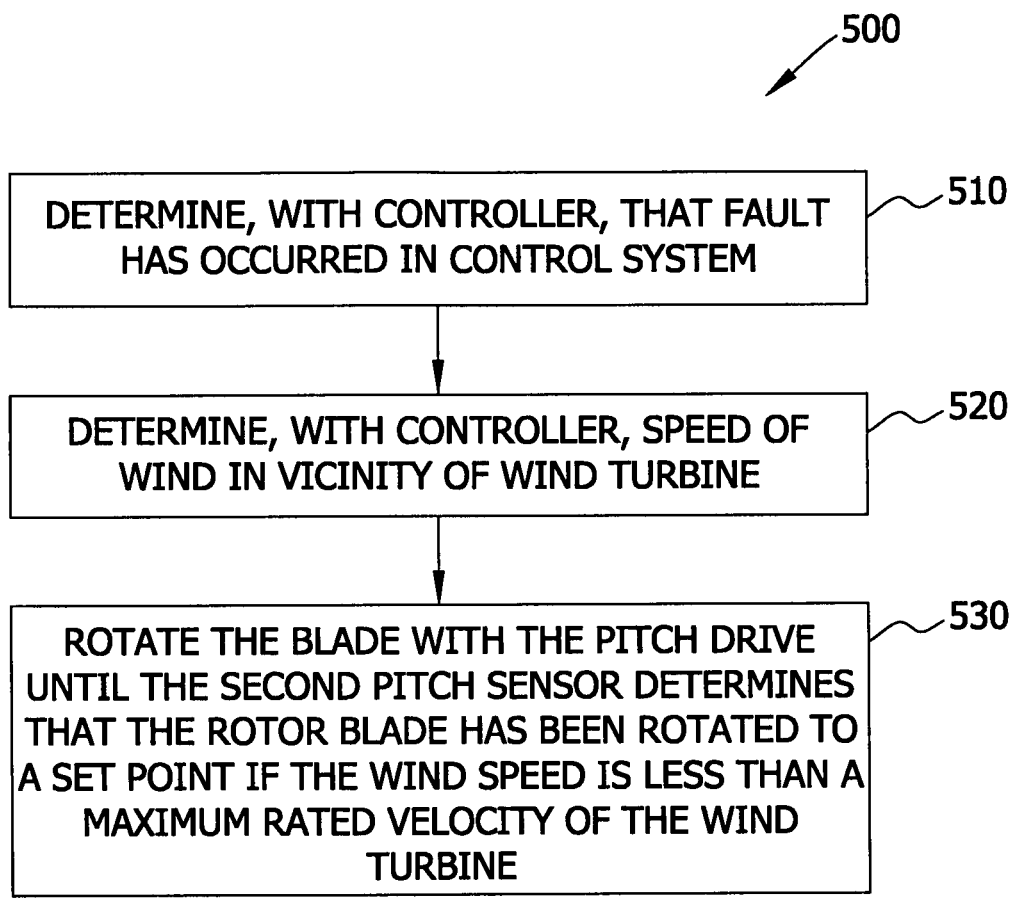
FIG. 5 is a flowchart of another exemplary method for operating the wind turbine shown in FIG. 1.

FIG. 5 illustrates a flowchart of an exemplary method 500 for use in operating wind turbine 10 (shown in FIG. 1) during the occurrence of a fault. Method 500 is generally directed to providing backup pitch control in situations where the speed of the wind is determined not to exceed the maximum rated velocity of wind turbine 10. Method 500 begins with a determination 510 by backup pitch controller 80 that a fault has occurred in pitch control system 70. In the exemplary embodiment, backup pitch controller 80 makes this determination 510 by receiving a communication from wind turbine controller 60 and/or pitch control system 70 via separate communication network 84.

Method 500 continues with a determination 520 by backup pitch controller 80 of the wind speed in the vicinity of wind turbine 10. Backup pitch controller 80 may detect the wind speed in the vicinity of wind turbine 10 with wind measuring device 148 (FIG. 2) or any other suitable device positioned in the vicinity of wind turbine 10. The maximum rated velocity of wind turbine 10 is the velocity of wind above which the wind turbine 10 may not be subject to unless blades 18 are in a feathered position where major surface is generally perpendicular to the direction of the wind. In the exemplary embodiment, the maximum rated velocity of wind turbine 10 is 25 m/s. If, however, the wind speed in the vicinity of wind turbine 10 is greater or equal to the maximum rated velocity of wind turbine 10, blades 18 are rotated according to method 400 described above.

If the controller determines that the wind speed in the vicinity of wind turbine 10 is less than the maximum rated velocity of wind turbine 10, blades 18 are then rotated 530 by pitch drives 42 until one of second pitch sensors 72 determines that blades 18 have been rotated to a set point. As described above, pitch drives 42 rotate blades 18 about the longitudinal axis of blades 18. The set point can vary between 20 degrees and 1 degree in the exemplary embodiment (resulting in a pitch angle of between 20 degrees and 1 degree), while in other embodiments the set point may vary between 15 degrees and 5 degrees (resulting in a pitch angle of between 15 degrees and 5 degrees), while in still other embodiments the set point may be approximately 10 degrees (e.g., within +/−2 degrees of 10 degrees) (resulting in a pitch angle of approximately 10 degrees).

As described above, second pitch sensors 72 are positioned with respect to blades 18 based on the set point such that each second pitch sensor 72 indicates when corresponding blade 18 has an angular position that corresponds with the set point. In the exemplary embodiment, two second pitch sensors 72 are provided. One of second pitch sensors 72 is positioned at a set point for use in method 400, while the other second pitch sensor is positioned at another set point for use in method 500 corresponding to the angular position of blades 18 when they are in a feathered position and major surface 19 is generally perpendicular to the direction of the wind.

After blades 18 are rotated 530 by pitch drives 42, method 500 may apply a brake (not shown) to prevent further rotation of blades 18. If the fault is cleared or backup pitch controller 80 otherwise determines that the fault is no longer occurring, the brake may be released and control of the system may be returned to pitch control system 70.

Moreover, method 500 may continue to monitor the speed of the wind in the vicinity of wind turbine 10. When the speed of the wind increases such that it becomes greater than or equal to the maximum rated velocity (i.e., max wind speed or cut-out wind speed) of wind turbine 10, method 500 may proceed as described in method 400 to rotate blades 18 to a feathered position.

When the speed of the wind drops below the maximum rated velocity of wind turbine 10, method 500 may release the brake and rotate blades 18 as described above in relation to method 400.

Figure 6:
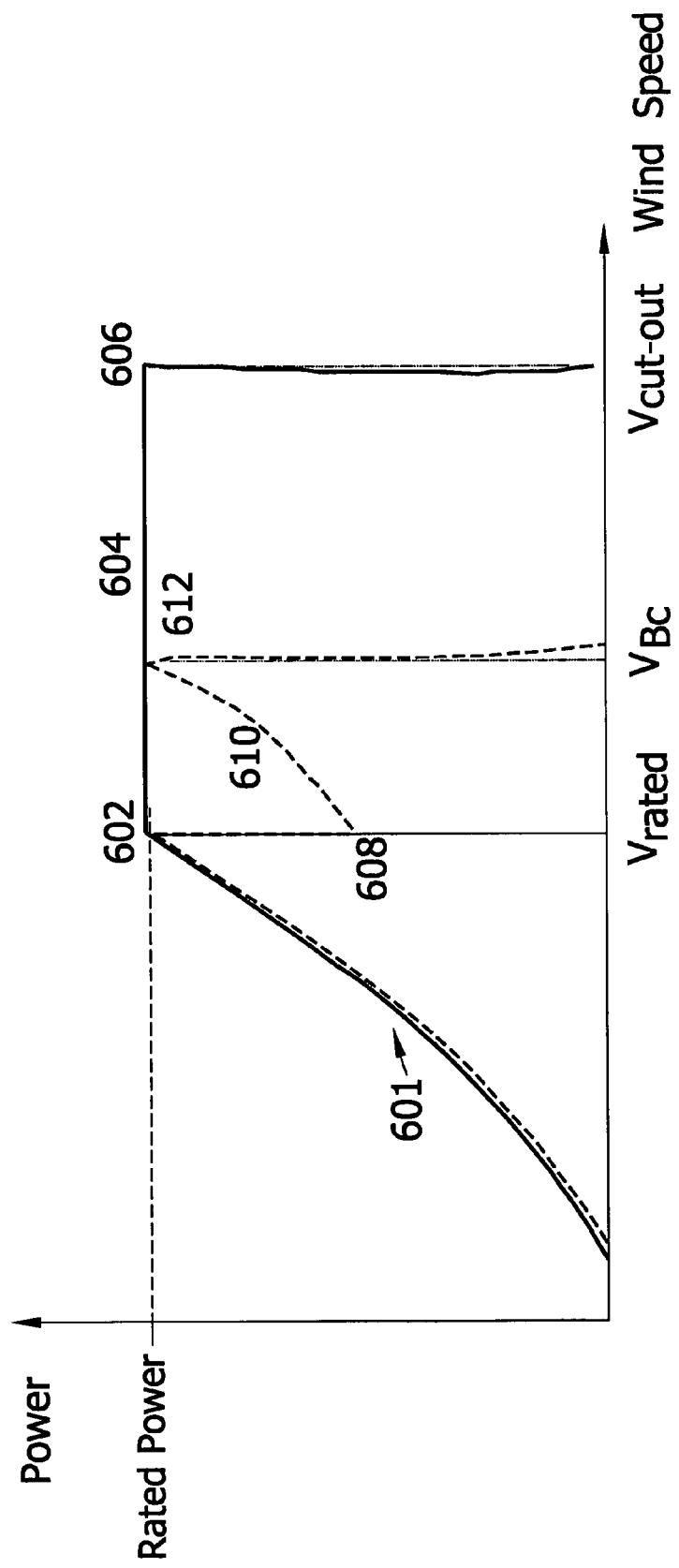
FIG. 6 is a graph of the power generated by an exemplary wind turbine versus a wind speed.

FIG. 6 is an exemplary graph showing the relationship between power generated by rotation of blades 18 versus wind speed. The solid line represents the power generation curve under normal conditions where pitch control system 70 and/or wind turbine controller 60 are not experiencing a fault. As shown in FIG. 6, normal operation of wind turbine 10 is represented by a portion of the curve labeled by reference numeral 601. Once the wind speed reaches $V_{rated}$, the pitch of blades 18 is adjusted at point 602 by pitch control system 70 and/or wind turbine controller 60 such that the power generated by rotation of blades 18 does not exceed a given threshold along portion 604 of the graph until the wind speed reaches $V_{cut-out}$ at portion 606 of the graph, at which time blades 18 are feathered and have a pitch angle of 90 degrees. Blades 18 then cease to rotate as they generate no significant lift and no appreciable power is generated. The dashed line represents the power generation curve under fault conditions backup pitch controller 80 is controlling the pitch of blades 18. During the portion 601 of the curve, torque control is used to control the amount of power generated by blades 18. Once the wind speed reaches $V_{rated}$ at point 608 of the graph, backup pitch controller 80 changes the pitch of blades 18 and during portion 610 of the curve power generation again increases along with increases in wind speed. Once wind speed reaches $V_{bc}$ at portion 612 of the graph, blades 18 are feathered.

The examples used herein are illustrative only, and are not meant to be limited to the elements of those examples. The above-described embodiments provide an efficient and cost-effective method for operating a wind turbine during a fault. The method improves the ability of the wind turbine to operate during a fault. The exemplary embodiment provides a backup pitch controller and pitch sensors to control operation of the pitch of the blades of the wind turbine during the occurrence of a fault. The backup pitch controller thus enables continued power generation by the wind turbine during a fault, as current systems typically cease power generation during the occurrence of a fault.

Exemplary embodiments of a wind turbine, a backup pitch controller, and a method for operating a wind turbine during the occurrence of a fault are described above in detail. The method, wind turbine, and controller are not limited to the specific embodiments described herein, but rather, components of the turbine and/or controller and/or steps of the method may be utilized independently and separately from other components and/or steps described herein. For example, the controller may also be used in combination with other systems and methods, and is not limited to practice with only the wind turbine and method as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for responding to faults in a control system in a wind turbine including a rotor coupled to at least one rotor blade, at least two pitch sensors coupled to the rotor blade, at least one pitch drive, and a controller communicatively coupled to the pitch sensors and the pitch drive, said method comprising:

determining, with the controller, that a fault has occurred in the control system;

determining, with the controller, a speed of wind in the vicinity of the wind turbine;

rotating the rotor blade using the pitch drive to a set point if the wind speed is greater than or equal to the maximum rated velocity of the wind turbine, the set point being an angular position of the rotor blade where the rotor blade is feathered;

applying a brake to prevent further rotation of the rotor blade once the rotor blade is rotated to the set point;

releasing the brake when the controller determines that the fault in the control system is cleared and the wind speed is less than the maximum rate velocity of the wind turbine; and returning control of the rotation of the pitch drive to the controller to facilitate continued operation of the wind turbine.

2. A method in accordance with claim 1, wherein, determining with the controller, that a fault has occurred in the control system comprises determining that a communication fault has occurred in the control system.

3. A method in accordance with claim 1, wherein the rotor blade is rotated about its longitudinal axis by the pitch drive.

4. A method in accordance with claim 1, wherein the set point is an angular position of the rotor blade where a pitch angle of the rotor blade is less than 2 degrees.

5. A method in accordance with claim 1, wherein rotating the rotor blade with the pitch drive to a set point comprises rotating the rotor blade until one of the pitch sensors determines that the rotor blade has been rotated to the set point.

6. A method in accordance with claim 1, wherein the controller receives communications from a wind speed sensor indicative of a speed of the wind.

7. A method for responding to faults in a control system in a wind turbine including a rotor coupled to at least one rotor blade, at least one pitch sensor coupled to the rotor blade, at least one pitch drive, and a controller communicatively coupled to the pitch sensor and the pitch drive, said method comprising:

determining, with the controller, that a fault has occurred in the control system;

determining, with the controller, a speed of wind in the vicinity of the wind turbine; and, rotating the rotor blade using the pitch drive if the controller determines that the wind speed is less than the maximum rate velocity of the wind turbine until the pitch sensor determines that the rotor blade has been rotated to a set point being an angular position of the rotor blade where the rotor blade is not feathered, thereby facilitating continued operation of the wind turbine during the fault.

8. A method in accordance with claim 7, wherein the rotor blade is rotated about a longitudinal axis by the pitch drive.

9. A method in accordance with claim 7, wherein determining with the controller that a fault has occurred in the control system includes determining that a communication fault has occurred in the control system.

10. A method in accordance with claim 7, wherein the set point is an angular position of the rotor blade where the rotor blade has a pitch angle of less than 20 degrees and greater than 2 degrees.

11. A method in accordance with claim 10, wherein the angular position of the set point is such that the pitch angle is less than 15 degrees and greater than 5 degrees.

12. A method in accordance with claim 10, wherein the angular position of the set point is such that the pitch angle is approximately 10 degrees.

13. A method in accordance with claim 8, wherein the longitudinal axis of the rotor blade is perpendicular to an axis about which the rotor is rotated.

14. A method in accordance with claim 12, further comprising:
rotating the rotor blade using the pitch drive to the set point if the wind speed is greater than or equal to the maximum rated velocity of the wind turbine, the set point being an angular position of the rotor blade where the rotor blade is feathered; and,
applying a brake to prevent further rotation of the rotor blade once the rotor blade is rotated to the set point.

15. A method in accordance with claim 14, further comprising releasing the brake when the controller determines that the fault in control system is cleared.

16. A backup pitch control system for controlling pitch of at least one blade of a wind turbine during occurrence of a fault in a primary control system of the wind turbine, said backup pitch control system comprising:
a pitch drive for rotating a rotor blade about a longitudinal axis of the rotor blade;
a pitch sensor positioned to determine when the rotor blade at a set point; and,
a backup controller communicatively coupled to the pitch drive and the pitch sensor, the backup controller configured to control operation of the pitch drive when a fault occurs in the primary control system, the backup controller further configured to rotate the rotor blade using the pitch drive if the backup controller determines that the wind speed is less than the maximum rate velocity of the wind turbine until the pitch sensor determines that the rotor blade has been rotated to a set point being an angular position of the rotor blade where the rotor blade is not feathered, thereby facilitating continued operation of the wind turbine during the fault.

17. A backup pitch control system in accordance with claim 16, wherein the backup controller is further configured to rotate the rotor blade using the pitch drive to the set point if the wind speed is greater than or equal to the maximum rated velocity of the wind turbine, the set point being an angular position of the rotor blade where the rotor blade is feathered, and, wherein the pitch sensor is positioned to indicate when the rotor blade has been rotated to a position such that a major surface of the blade is substantially perpendicular to a direction of wind.

18. A backup pitch control system in accordance with claim 16, wherein the pitch sensor is positioned to indicate when the rotor blade has been rotated to a position such that a major surface of the blade is oriented such that the wind strikes the major surface at an angle of less than 15 degrees and greater than 5 degrees.

19. A backup pitch control system in accordance with claim 18, further comprising a second pitch sensor positioned to indicate when the rotor blade has been rotated to a position such that the major surface of the blade is substantially perpendicular to the direction of wind if the backup controller determines that the wind speed is greater than or equal to the maximum rated velocity of the wind turbine.

* * * * *